US008689282B1

(12) United States Patent  
Oprea et al.

(10) Patent No.: US 8,689,282 B1
(45) Date of Patent: Apr. 1, 2014

(54) SECURITY POLICY ENFORCEMENT FRAMEWORK FOR CLOUD-BASED INFORMATION PROCESSING SYSTEMS

(75) Inventors: Alina M. Oprea, Arlington, MA (US); Yinqian Zhang, Chapel Hill, NC (US); Vijay Ganti, Lexington, MA (US); John P. Field, Chatham, NJ (US); Ari Juels, Brookline, MA (US); Michael Kendrick Reiter, Chapel Hill, NC (US)

(73) Assignees: EMC Corporation, Hopkinton, MA (US); University of North Carolina at Chapel Hill, Chapel Hill, NC (US)

( * ) Notice: Subject to any disclaimer, the term of this patent is extended or adjusted under 35 U.S.C. 154(b) by 38 days.

(21) Appl. No.: 13/336,692

(22) Filed: Dec. 23, 2011

(51) Int. Cl.
*H04L 29/06* (2006.01)

(52) U.S. Cl.
USPC .................................. 726/1; 726/30

(58) Field of Classification Search
USPC ....................................... 726/1, 30
See application file for complete search history.

(56) References Cited

U.S. PATENT DOCUMENTS

| 6,675,128 | B1 * | 1/2004 | Hellerstein .................... 702/182 |
| 2006/0206440 | A1 * | 9/2006 | Anderson et al. ............. 705/500 |
| 2010/0154045 | A1 * | 6/2010 | Pairault et al. .................... 726/8 |
| 2011/0265164 | A1 * | 10/2011 | Lucovsky et al. ................. 726/7 |
| 2011/0276951 | A1 * | 11/2011 | Jain .............................. 717/140 |
| 2011/0321120 | A1 * | 12/2011 | Saxena et al. .................... 726/1 |
| 2012/0102541 | A1 * | 4/2012 | Groskop et al. .................. 726/1 |

OTHER PUBLICATIONS

Calheiros, Rodrigo N., et al. "Cloudsim: A novel framework for modeling and simulation of cloud computing infrastructures and services." arXiv preprint arXiv:0903.2525 (2009).*
U.S. Appl. No. 13/174,177 filed in the name of Juels et al. on Jun. 30, 2011 and entitled "Co-Residency Detection in a Cloud-Based System."

* cited by examiner

*Primary Examiner* — Kambiz Zand
*Assistant Examiner* — Michael Guirguis
(74) *Attorney, Agent, or Firm* — Ryan, Mason & Lewis, LLP

(57) ABSTRACT

Cloud infrastructure of a cloud service provider comprises a processing platform implementing a security policy enforcement framework. The security policy enforcement framework comprises a policy analyzer that is configured to identify at least one security policy associated with at least one tenant of the cloud service provider, to analyze the security policy against configuration information characterizing the cloud infrastructure of the cloud service provider, and to control execution of one or more applications of said at least one tenant within the cloud infrastructure in accordance with the security policy, based at least in part on one or more results of the analysis of the security policy. The security policy enforcement framework may be implemented in a platform-as-a-service (PaaS) layer of the cloud infrastructure, and may comprise a runtime controller, an operating system controller, a hypervisor controller and a PaaS controller.

22 Claims, 5 Drawing Sheets

SECURITY POLICY ENFORCEMENT FRAMEWORK FOR CLOUD-BASED INFORMATION PROCESSING SYSTEMS

STATEMENT REGARDING FEDERALLY SPONSORED RESEARCH

This invention was made with Government support under Grant No. CNS-0910483 awarded by the National Science Foundation. The Government has certain rights in the invention.

FIELD

The field relates generally to information processing systems, and more particularly to cloud-based information processing systems.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

In cloud-based information processing system arrangements of the type described above, enterprises in effect become tenants of the cloud service providers. However, by relinquishing control over their information technology resources, these cloud tenants expose themselves to additional potential security threats. For example, a given tenant may be inadvertently sharing physical hardware resources with other tenants that could be competitors or attackers.

Security can be particularly problematic in the context of PaaS, where cloud tenants are provided with various functionalities that enable them to develop, test and deploy their applications on the same processing platform. This increasingly popular cloud service model promises significant future market growth. Examples of known PaaS clouds include the Google App Engine, Windows Azure and VMWare® Cloud Foundry. However, security concerns arising from multi-tenancy are still a major obstacle to wider adoption of the PaaS model, particularly in that different tenants may share the same operating system. Compared to an IaaS model, where security isolation can be provided by virtualization, the security boundary among tenants in the PaaS model is more ambiguous. As a result, PaaS providers may need to implement logical isolation among tenant applications running in the same operating system. This becomes especially challenging in a heterogenous environment supporting multiple runtimes and operating systems.

The Google App Engine addresses this issue by employing a homogeneous software stack and imposing undesirable restrictions on applications. Other existing approaches may rely upon inefficient manual configuration of virtualized infrastructure and associated security policies, and are therefore not readily scalable to large numbers of tenants.

SUMMARY

Illustrative embodiments of the invention provide techniques for security policy enforcement that are particularly well suited for use in the PaaS context. For example, a given such arrangement enables cloud service providers to isolate tenants residing in the same operating system using an automatic approach that is efficient and scalable. These techniques can also be adapted for use in providing other types security enforcement for other types of cloud-based systems.

In one embodiment, cloud infrastructure of a cloud service provider comprises a processing platform implementing a security policy enforcement framework. The security policy enforcement framework comprises a policy analyzer that is configured to identify at least one security policy associated with at least one tenant of the cloud service provider, to analyze the security policy against configuration information characterizing the cloud infrastructure of the cloud service provider, and to control execution of one or more applications of said at least one tenant within the cloud infrastructure in accordance with the security policy, based at least in part on one or more results of the analysis of the security policy. By way of example, the security policy enforcement framework may be implemented in a PaaS layer of the cloud infrastructure, and may comprise a runtime controller, an operating system controller, a hypervisor controller and a PaaS controller.

One or more of the illustrative embodiments described herein overcome the difficulties associated with tenant isolation using the above-noted conventional approaches. For example, logical isolation can be provided among tenant applications running in the same operating system, even in heterogenous environments supporting multiple runtimes and operating systems, thereby avoiding the need to employ a homogeneous software stack or to impose undesirable restrictions on applications. Also, inefficient manual configuration of virtualized infrastructure and associated security policies is avoided.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
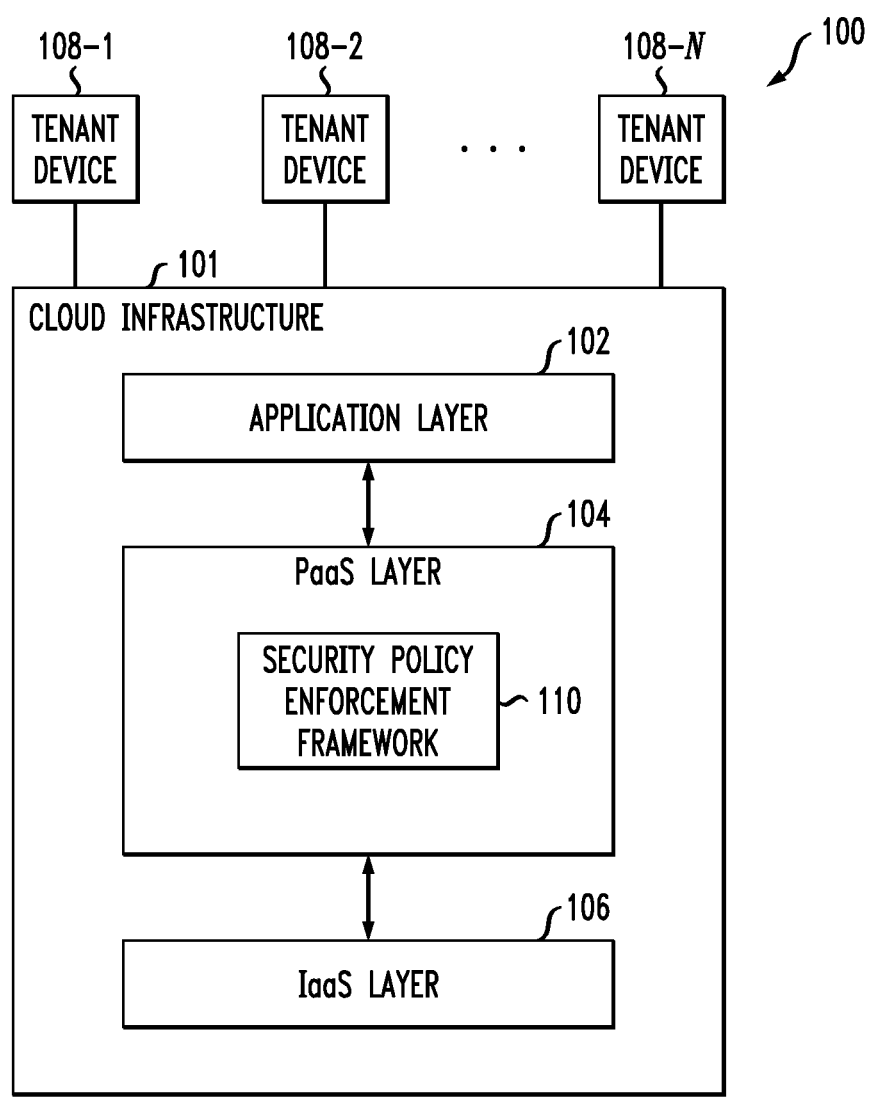
FIG. 1 is a block diagram of a cloud-based information processing system implementing a security policy enforcement framework in an illustrative embodiment of the invention.

FIG. 1 shows an information processing system 100 configured in accordance with an illustrative embodiment of the present invention. The information processing system 100 comprises cloud infrastructure 101 that includes an application layer 102, a PaaS layer 104 and an IaaS layer 106. Tenants associated with respective tenant devices 108-1, 108-2, ... 108-N utilize services provided by the cloud infrastructure 101, and the tenant devices may be configured to access the cloud infrastructure via a network or other communication channel. The term "tenant" as used herein is intended to be broadly construed, and may be used to refer to a user or other entity, its associated device or both. The same reference numeral 108 will be used for all of these cases.

The cloud infrastructure 101 may comprise, for example, software products running on a processing platform of a cloud service provider, although other types of products, including hardware products or virtualized products, may additionally or alternatively be utilized by at least a subset of the tenants 108. The cloud infrastructure 101 may be viewed as comprising physical infrastructure and associated virtualization infrastructure running on the physical infrastructure.

An example of a processing platform suitable for providing these and other types of information technology infrastructure suitable for implementing at least a portion of the system 100 will be described in more detail below in conjunction with FIG. 4.

The system 100 further comprises a security policy enforcement framework 110 that is illustratively implemented within the PaaS layer 104. The security policy enforcement framework 110 identifies at least one security policy associated with a given one of the tenants 108, and analyzes the security policy against configuration information characterizing cloud infrastructure 101. The security policy enforcement framework 110 then controls execution of one or more applications of the given tenant within the cloud infrastructure 101 in accordance with the security policy, based at least in part on one or more results of the analysis of the security policy.

By way of example, the security policy analysis performed by the security policy enforcement framework 110 may comprise determining if the security policy is enforcable based on the configuration information characterizing the cloud infrastructure. If the security policy is determined to be enforceable, the security policy analysis may further involve determining control information to be provided to one or more controllers of the security policy enforcement framework in order to carry out the security policy.

If it is determined that the security policy is not enforceable, this condition may be reported by the security policy enforcement framework 110 to one or more other system components. Additionally or alternatively, in the event of a determination that the security policy is not enforceable, the security policy enforcement framework may identify or activate one or more compensating controls that could substitute for an unsatisfiable requirement. For example, the framework might be configured to substitute a data encryption capability in place of a control that requires storage on a separate physical device.

The security policy enforcement framework 110 in the present embodiment provides security enforcement for the PaaS layer 104 in a manner that enables cloud service providers to isolate tenants residing in the same operating system in an automatic, scalable way. Using the framework, the cloud service provider can automatically analyze the isolation capabilities of different components in a heterogeneous software stack in order to obtain a unified, global perspective on the capability of the platform. The provider can enforce consistent security policies for diverse application runtime environments without acquiring sophisticated security expertise or performing error-prone manual configuration. Tenants residing in the same virtual machine can therefore be isolated from one another, from both a security perspective and a resource consumption perspective. Moreover, the tenants can specify additional security requirements for their applications that can be enforced by the framework at both install time and run time. As noted above, the enforcement may involve utilization of one or more compensating controls identified or activated by the framework.

The security policy enforcement framework 110 may be implemented on a common processing platform with other portions of the cloud infrastructure 101, or alternatively may be implemented at least in part on one or more separate processing platforms. Also, although shown in FIG. 1 as being part of the PaaS layer 104 of the cloud infrastructure 101, the security policy enforcement framework 110 may alternatively be implemented at least in part in one or more other layers of the cloud infrastructure 101. Furthermore, in other embodiments the security policy enforcement framework 110 need not share any physical or virtual infrastructure with the cloud service provider. It is also to be understood that a given embodiment of the system 100 may include multiple instances of the elements 101, 102, 104, 106 and 110, although only single instances of such elements are shown in the system diagram for clarity and simplicity of illustration.

Figure 2:
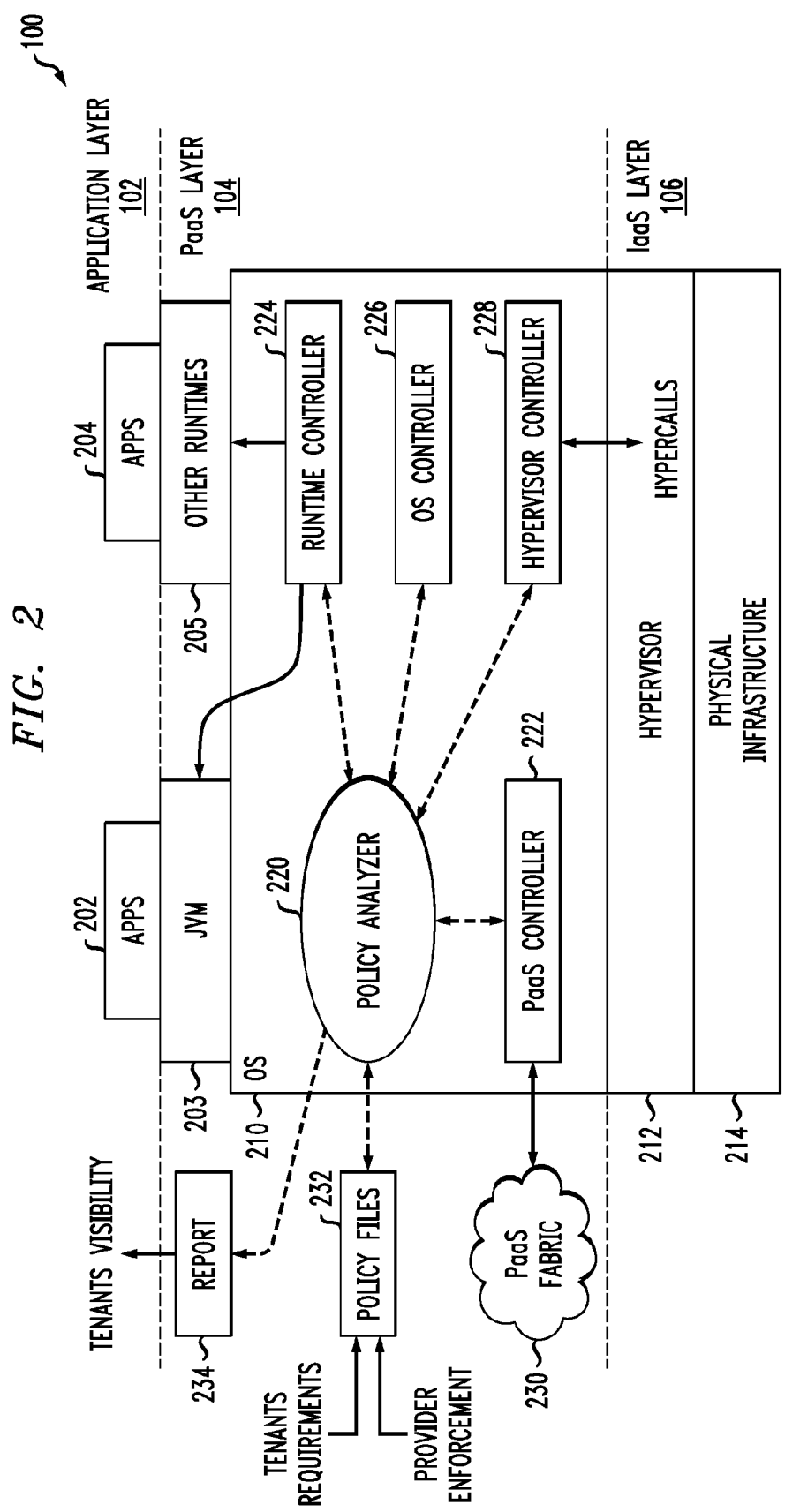
FIG. 2 shows a more detailed view of a portion of the system of FIG. 1.

Referring now to FIG. 2, a portion of the information processing system 100 is shown in greater detail. In this embodiment, a first set of applications 202 of the application layer 102 is implemented using a Java virtual machine (JVM) runtime environment 203 in the PaaS layer 104, and a second set of applications 204 of the application layer 102 is implemented using one or more other runtime environments 205 in the PaaS layer 104. The JVM runtime environment provides an environment in which Java bytecode can be executed, and permits features such as automated exception handling.

The runtime environments 203 and 205 are supported by an operating system (OS) 210 of the PaaS layer 104. The operating system 210 runs under the control of a hypervisor 212 implemented on physical infrastructure 214 in the IaaS layer 106.

Although only a single hypervisor 212 is shown in the embodiment of FIG. 2, the system 100 may of course include multiple hypervisors each providing a set of virtual machines using at least one underlying physical machine.

An example of a commercially available hypervisor platform that may be used to implement hypervisor 212 and possibly other portions of the cloud infrastructure 101 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure 101.

The security policy enforcement framework 110 in the present embodiment comprises a policy analyzer 220, a PaaS controller 222, a runtime controller 224, an operating system controller 226 and a hypervisor controller 228. Although all of these components of the security policy enforcement framework 110 are shown as being implemented in the operating system 210 of the PaaS layer 104 in the present embodiment, in other embodiments at least portions of one or more the framework components may be implemented in other layers such as 102 or 106, or more generally in other parts of the system 100.

The policy analyzer 220 determines if a particular security policy is enforcable based on configuration information characterizing the cloud infrastructure 101. If the security policy is enforceable, the policy analyzer provides control information to one or more of the controllers 222, 224, 226 and 228 to carry out the security policy. The policy analyzer 220 may determine the configuration information based on information received from one or more of the controllers 222, 224, 226 and 228. As indicated previously, if the policy analyzer 220 determines that a given security policy is not enforceable, the policy analyzer or other component of the security policy enforcement framework 110 may identify or activate one or more compensating controls that could substitute for an unsatisfiable requirement.

In a given embodiment, the policy analyzer 220 may be configured to analyze different isolation capabilities automatically, using feedback from the controllers 222, 224, 226 and 228. It may utilize a logical language and an associated reasoning engine to represent the isolation capabilities of different components of the system and to understand the logical relationships between these components.

Accordingly, in the system 100, the security policies of the tenants and service provider are analyzed against the security capabilities of the platform by the policy analyzer 220. The policy analyzer determines if the policies are satisfiable and possible ways of enforcing those policies using the capabilities of different system components.

The PaaS controller 222 is configured to interface with a PaaS fabric 230 of the PaaS layer 104. In particular, the PaaS controller 222 makes PaaS cloud fabric related information available to the policy analyzer 220.

The runtime controller 224 is configured to interface with the runtime environments 203 and 205 of the respective sets of applications 202 and 204. The runtime controller 224 in the present embodiment is responsible for managing all runtime libraries, including maintaining library version, sandboxing capability, configurable parameters, and other related information. It also controls the runtime environments by modifying associated configuration files, and provides a mechanism for runtime access control in order to enforce security policies dynamically within the system 100.

The operating system controller 226 is associated with the operating system 210 that is utilized by the runtime environments 203 and 205. The operating system controller may be implemented as a kernel module that controls the security tools available to the operating system. For example, it may maintain the mandatory access control (MAC) and/or discretionary access control (DAC) capabilities of the operating system as well as the entire system security perimeter, including software version numbers, password policies, etc. It may also control the software firewall in the operating system to restrict network connections.

The hypervisor controller 228 is configured to interface with the hypervisor 212 that implements one or more virtual machines of the cloud infrastructure. This interface may involve the use of hypercalls as indicated in the figure. The hypervisor controller 228 in the present embodiment may keep track of all the information made available through the hypercall interface to the hypervisor and is responsible for issuing hypercalls to query this information whenever requested by an application. An authorization module may be implemented inside the hypervisor controller 228 in order to authorize access to the hypervisor 212. For instance, the controller may be implemented such that only applications of tenants who paid for such access services can issue hypercalls. Additional hypercalls may be implemented for hardware, co-residency or geolocation information related security policies.

Although shown as separate controllers in the figure, two or more of the controllers 222, 224, 226 and 228 may be combined into a single controller. At least a portion of the policy analyzer 220 may be incorporated into one or more of the controllers. Also, one or more of the controllers may be implemented as extensions of a control agent installed within a given virtual machine in the PaaS layer 104.

The policy analyzer 220 determines a security policy that in this embodiment is characterized at least in part by policy files 232. A given one of the policy files 232 may characterize one or more security policies, each of which may incorporate tenant requirement information and cloud service provider enforcement information. Alternatively, separate policy files may be used for each tenant and the service provider.

A given security policy in the present embodiment may include multiple security specifications. For example, the security policy may specify that applications associated with a given one of the tenants 108 are restricted from reading files associated with other tenants, or that applications associated with a given one of the tenants only communicate with applications that belong to that same tenant. Additionally or alternatively, the security policy may specify that an application associated with a given tenant only be scheduled on a physical machine on which no other instances of the same application are running. Of course, these are only examples, and a wide variety of other types of security policies may be enforced in the system 100 using the security policy enforcement framework 110. The term "security policy" as used herein is therefore intended to be broadly construed, so as to encompass, for example, policies relating to one or more security-related factors such as confidentiality, integrity and availability. Thus, one or more of the policy files 232 may include information about requirements for one or more of these factors.

The tenants 108 may be permitted to specify respective sets of security policies required for their applications at install time, as well as run time policies. The above-noted logical language may be used for specifying diverse security requirements.

The policy analyzer 220 in the present embodiment implements logic for expressing security capabilities of different components and reasoning about satisfiability of security policies. As noted above, it may gather information from the controllers 222, 224, 226 and 228 in order to synthesize the security capabilities of at least one associated virtual machine. It also receives the policy files specified by both the tenants and the cloud service provider, analyzes the desired security requirements, and compares them with its own determination of security capabilities of the system. Whenever satisfiable, the security policy may be automatically implemented by providing appropriate control information to the controllers 222, 224, 226 and 228, which in turn control the behavior of the platform.

The FIG. 2 embodiment also includes reporting functionality implemented using report element 234. For example, a report may be provided from the policy analyzer 220 to a given tenant through the report element 234, regarding enforcement of at least one security policy involving that tenant. Such reports are used to provide visibility for the tenants into the security policy enforcement provided by the framework 110.

The reporting functionality of the FIG. 2 embodiment may additionally or alternatively comprise a management component having a programmatic interface and a graphical user interface. Such a management component can be configured, for example, to provide a visual representation of the policy analysis carried out by the policy analyzer 220, and to assist the user in exploring different options for satisfying required policies. The term "report" as used herein is intended to encompass these and other types of information that may be provided by one or more interfaces under the control of a management component.

It is to be appreciated that the particular sets of modules and other components as implemented in the system 100 as illustrated in FIGS. 1 and 2 are presented by way of example only. In other embodiments, only subsets of these components, or additional or alternatives sets of components, may be used, and such components may exhibit alternative functionality and relationships. Another example of a security policy enforcement framework suitable for implementation in system 100 will be described in conjunction with FIG. 5.

The operation of the security policy enforcement framework 110 will now be described in greater detail with reference to FIG. 3, which shows a security policy enforcement process implemented in the system 100 in an illustrative embodiment. The process as shown comprises steps 300 through 308.

In step 300, at least one security policy associated with at least a given one of the tenants 108 is identified. The tenants 108 in the present embodiment are assumed to be tenants of a cloud service provider that makes at least a portion of the cloud infrastructure 101 available to the tenants as part of a PaaS offering.

In step 302, the security policy is analyzed against configuration information characterizing cloud infrastructure 101 of the cloud service provider. As noted above, this configuration information may be obtained by the policy analyzer 220 through interaction with one or more of the controllers 222, 224, 226 and 228.

In step 304, the policy analyzer 220 determines if the security policy can be satisfied in view of the configuration information.

If the security policy can be satisfied, the policy analyzer 220 in step 306 controls execution of one or more applications of the given tenant within the cloud infrastructure of the cloud service provider in accordance with the security policy, based at least in part on one or more results of the analyzing step 302. The process then moves to step 308 in order to report to the tenant and the cloud service provider regarding the particular manner in which the security policy is being enforced within the system.

If the security policy cannot be satisfied, the policy analyzer 220 instead moves directly to step 306 to report to the tenant and the cloud service provider that the security policy is not currently being enforced within the system. It may also determine one or more appropriate compensating controls as noted above.

After completion of the reporting operation in step 308, the process returns to step 300 to handle additional security policies on behalf of the given tenant or other tenants.

Figure 3:
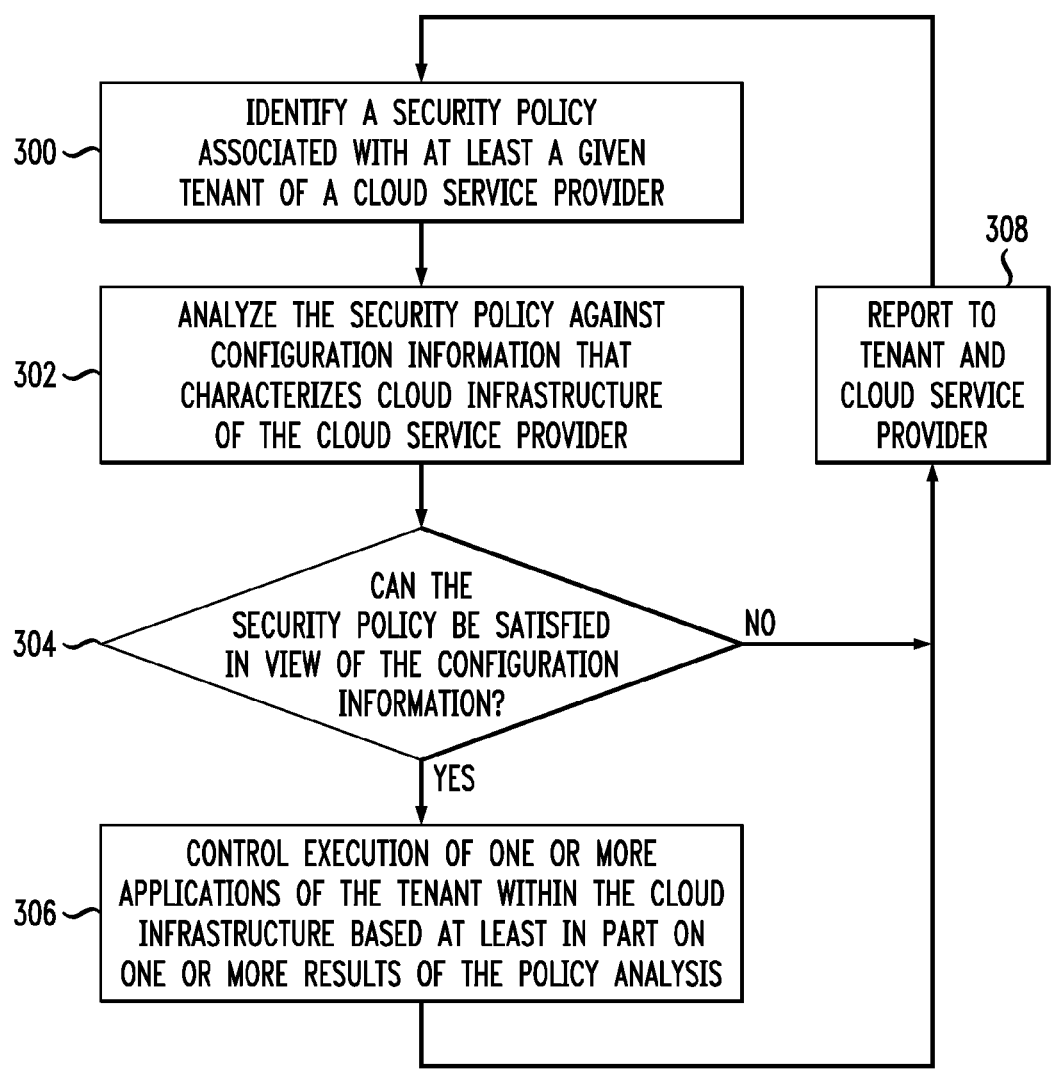
FIG. 3 is a flow diagram of a security policy enforcement process that may be implemented in the system of FIG. 1.

It should be understood that the particular process steps shown and described in conjunction with the flow diagram of FIG. 3 are exemplary only, and that additional or alternative steps may be used in other embodiments. Also, the ordering of the steps may be altered in other embodiments. Thus, for example, steps that are shown as being performed in one order in the figure may be performed in other orders in other embodiments, or steps that are performed serially may be performed at least in part in parallel with one another.

A number of examples further illustrating the operation of the security policy enforcement framework 110 will now be described.

In a first example, sandboxing policies are automatically constructed. A simple policy may be to restrict applications from reading files from other tenants. The policy analyzer 220 will query the controllers, in particular the runtime controller 224 and the operating system controller 226, for approaches to restricting file access. Assume that two runtime environments are available, a Java runtime environment with a JVM sandbox and a python runtime environment without a sandbox. The policy analyzer 220 may choose to make use of the JVM sandbox for Java applications and may use an operating system level isolation mechanism, such as the above-noted DAC capability of the operating system, to enforce security isolation for python applications. Of course, it may choose to implement the isolation using DAC for both cases.

As a second example, consider an embodiment with one or more tenant-specified security policies. A tenant might specify as a security policy a requirement that an application only communicate to other applications belonging to the same tenant that run on the same cloud infrastructure. In addition, the tenant might also require that this application is only scheduled on a physical machine on which no other instances of the same application are running, in order to facilitate satisfaction of fault tolerance metrics. Tenant-specified policies of this type may be useful for "worker" applications that serve as a back-end web service in the cloud.

In this example, the policy analyzer 220 may try to get information from the PaaS controller 222 about other applications running on the same cloud infrastructure, including their IP address and port number if direct communication is allowed, as well as the identifier of the virtual machine they are running on. Since the PaaS environment usually does not have information about virtual machine co-residency, the policy analyzer may also need to query the hypervisor controller 228 for identifiers of virtual machines that share the same physical machine. In this way, the policy analyzer can determine if there are other instances of the same application running on the same physical machine at install time. It may also notify the operating system controller 226 for dynamic network access control since any illegal communication should be filtered out at run time.

One or more of the illustrative embodiments described above advantageously allow cloud service providers to isolate tenants residing in the same operating system using an automatic approach that is efficient and scalable. Thus, for example, logical isolation can be provided among tenant applications running in the same operating system, even in heterogenous environments supporting multiple runtimes and operating systems, thereby avoiding the need to employ a homogeneous software stack or to impose undesirable restrictions on applications. Also, inefficient manual configuration of virtualized infrastructure and associated security policies is avoided.

A cloud service provider can therefore automatically configure their hardware and software stacks for enhanced security in terms of confidentiality, integrity, availability and/or other factors, at minimal cost. Furthermore, single points of failure and unnecessary redundancy are eliminated.

As indicated previously, the system 100 may be implemented using one or more processing platforms. An example of such a processing platform is processing platform 400 shown in FIG. 4. The processing platform 400 in this embodiment comprises a portion of the system 100 and includes a plurality of servers, denoted 402-1, 402-2, 402-3, . . . 402-M, which communicate with one another over a network 404. A given such server may be viewed as an example of what is more generally referred to herein as a "processing device." Other examples of processing devices may include computers or storage devices, as well as combinations of these and other devices. One or more of the processing modules of system 100 may therefore each run on a server or other processing device.

Figure 4:
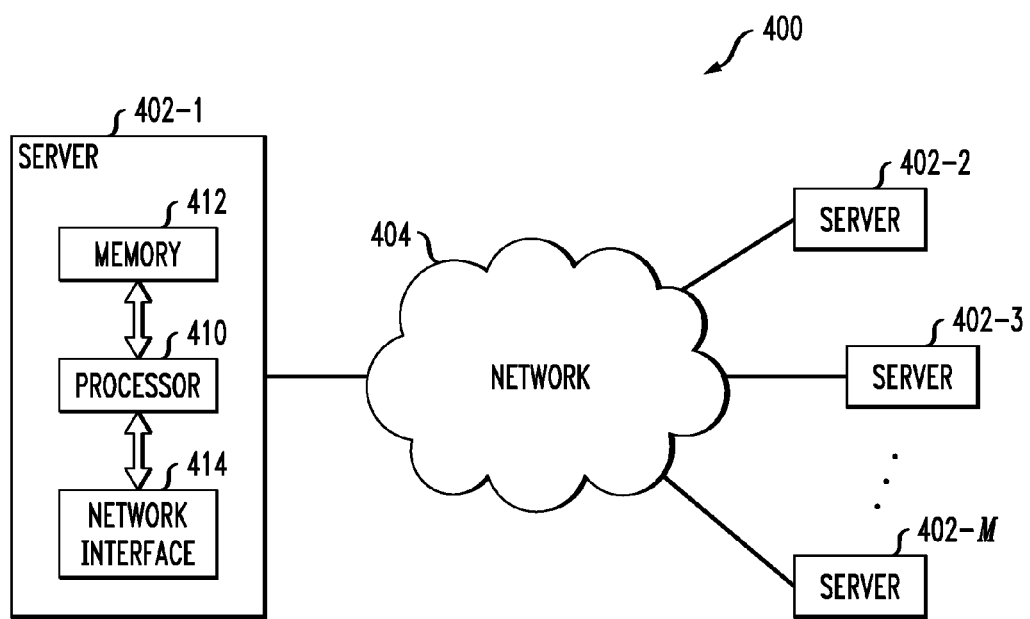
FIG. 4 shows an exemplary processing platform that may be used to implement at least a portion of the system of FIG. 1.

As illustrated in FIG. 4, such a server or other processing device generally comprises at least one processor and an associated memory, and implements one or more functional modules or other components for controlling certain features of the information processing system 100. Again, multiple ones of the processing modules of system 100 may be implemented by a single processing device in a given embodiment. Also, it should be noted that a given processing device may comprise one or more virtual machines.

The server 402-1 in the processing platform 400 more particularly comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. The memory 412 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the server 402-1 causes the device to perform functions associated with one or more of the modules of system 100, such as the security policy enforcement framework 110. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the server 402-1 is network interface circuitry 414, which is used to interface the server with the network 404 and other system components. Such circuitry may comprise conventional transceivers of a type well known in the art.

The other servers 402 of the processing platform 400 are assumed to be configured in a manner similar to that shown for server 402-1 in the figure.

Again, the particular processing platform 104 shown in the figure is presented by way of example only, and system 100 may include additional or alternative processing platforms, as well as numerous distinct processing platforms in any combination, each comprising one or more computers, servers, storage devices, or other processing devices.

It is therefore to be appreciated that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

It was noted above that the system 100 may comprise cloud infrastructure, and such infrastructure may be implemented at least in part using a processing platform of the type shown in FIG. 4. Such cloud infrastructure may comprise virtual machines implemented using a hypervisor or other virtualization infrastructure running on physical infrastructure. Sets of applications may run on respective ones of the virtual machines under the control of the hypervisor. A given embodiment of cloud infrastructure may include multiple hypervisors, each running on its own physical infrastructure.

As indicated previously, the security policy enforcement functionality disclosed herein can be implemented at least in part in the form of one or more software programs stored in memory and executed by a processor of a processing device such as a processing device 402 used to implement one or more virtual machines. As noted above, a memory having such program code embodied therein is an example of what is more generally referred to herein as a "computer program product."

Figure 5:
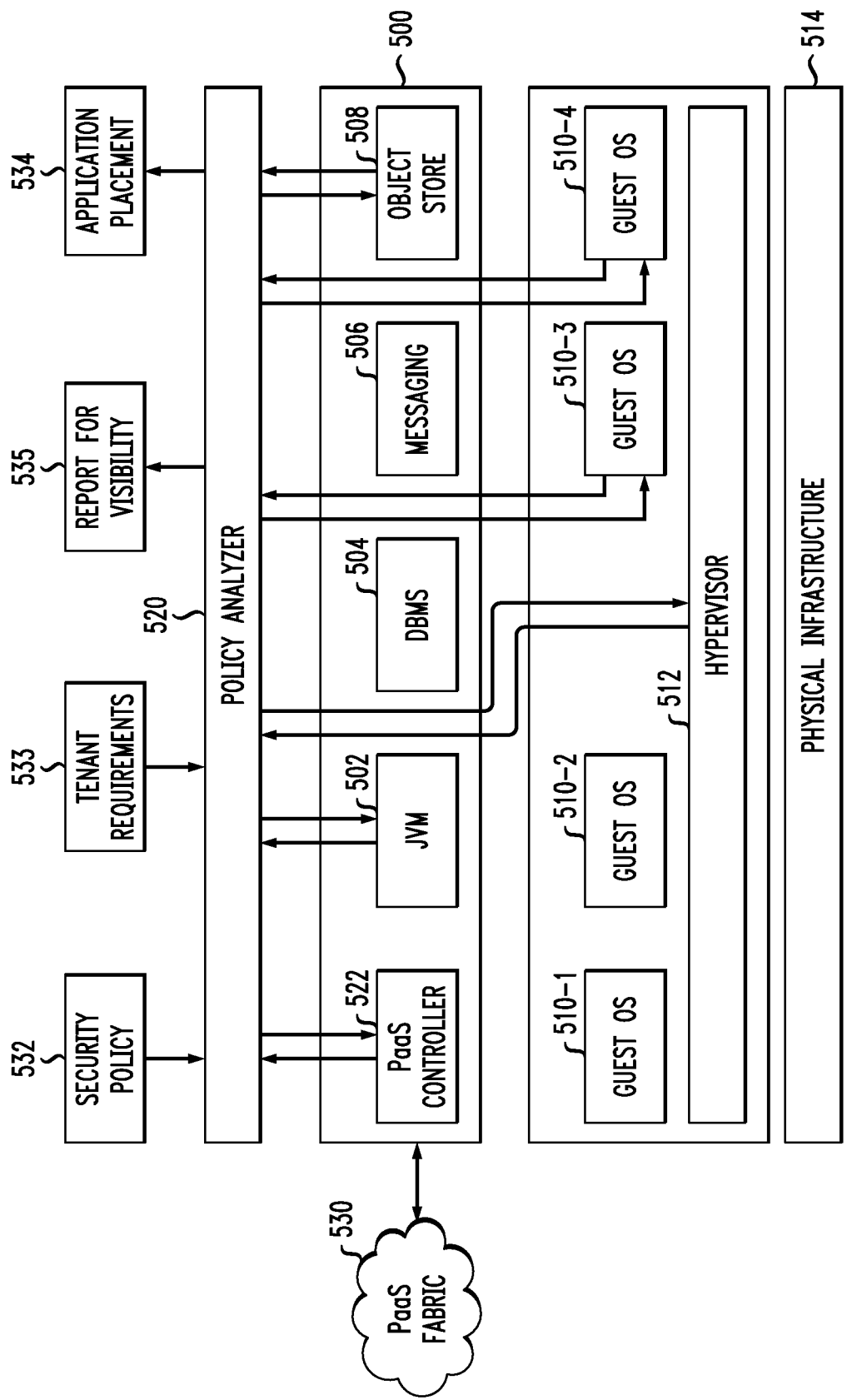
FIG. 5 shows another example of a security policy enforcement framework in an illustrative embodiment.

FIG. 5 shows another example of a security policy enforcement framework in an illustrative embodiment. In this embodiment, a processing layer 500 comprises a JVM 502, a database management system (DBMS) 504, a messaging system 506 and an object store 508. A plurality of guest operating systems 510-1, 510-2, 510-3 and 510-4 are implemented under the control of a hypervisor 512 running on physical infrastructure 514.

The security policy enforcement framework comprises policy analyzer 520 and PaaS controller 522, which operate in a manner similar to the corresponding elements 220 and 222 of the FIG. 2 embodiment. The PaaS controller 522 interfaces the policy analyzer 520 to PaaS fabric 530. The policy analyzer 520 in this embodiment receives as inputs one or more security policies 532 as well as tenant requirements 533, and interacts with elements such as 502, 508, 510, 512 and 522, and possibly others, in order to determine the security capabilities of the system. It also controls an application placement or workload deployment module 534 in order to enforce one or more of the security policies. The module 534 may therefore control application placement and/or one or more other workload deployment functions. Finally, the policy analyzer drives a report for visibility module 535 which may be used to inform tenants and/or the service provider regarding policy enforcement. The tenant requirements 533 may include any aspect of the PaaS security requirements, including confidentiality, integrity and/or availability, as well as additional requirements or preferences, such as other constraints on handling a tenant deployment request.

It should again be emphasized that the above-described embodiments of the invention are presented for purposes of illustration only. Many variations and other alternative embodiments may be used. For example, although described in the context of particular system and device configurations, the security policy enforcement techniques disclosed herein are applicable to a wide variety of other types of cloud-based systems and processing devices. The particular process steps and component interactions used to implement security policy enforcement may be varied in alternative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   identifying at least one security policy associated with a given tenant of a cloud service provider;
   analyzing the security policy against configuration information characterizing cloud infrastructure of the cloud service provider, the cloud infrastructure comprising physical infrastructure and associated virtualization infrastructure running on the physical infrastructure; and
   controlling execution of one or more applications of the given tenant within the cloud infrastructure of the cloud service provider in accordance with the security policy based at least in part on one or more results of the analyzing step;
   wherein the identifying, analyzing and controlling steps are implemented in a security policy enforcement framework of a processing platform of the cloud infrastructure; and
   wherein the security policy associated with the given tenant comprises one or more tenant-specified rules related to isolation of the given tenant with respect to one or more other tenants of the cloud service provider.

2. The method of claim 1 wherein said at least one security policy incorporates at least one of tenant requirement information and service provider enforcement information.

3. The method of claim 1 wherein the analyzing step is implemented in a policy analyzer of the security policy enforcement framework and further comprises determining if the security policy is enforceable based on the configuration information characterizing the cloud infrastructure, and if the security policy is enforceable determining control information to be provided by the policy analyzer to one or more controllers of the security policy enforcement framework to carry out the security policy.

4. The method of claim 3 wherein said one or more controllers comprise at least a runtime controller configured to interface with runtime environments of said one or more applications.

5. The method of claim 4 wherein the runtime environments comprise a virtual machine runtime environment and at least one other runtime environment.

6. The method of claim 3 wherein said one or more controllers comprise at least an operating system controller associated with an operating system utilized by runtime environments of said one or more applications.

7. The method of claim 3 wherein said one or more controllers comprise at least a hypervisor controller configured to interface with a hypervisor that implements a virtual machine utilized by said one or more applications.

8. The method of claim 3 wherein said security policy enforcement framework is implemented in a platform-as-a-service (PaaS) layer of the cloud infrastructure and said one or more controllers comprise at least a PaaS controller configured to interface with a PaaS fabric of the PaaS layer.

9. The method of claim 3 further comprising the step of providing a report from the policy analyzer to the given tenant regarding enforcement of said at least one security policy, wherein the report is provided under the control of a management component of the security policy enforcement framework.

10. The method of claim 3 further comprising the step of determining the configuration information in the policy analyzer based on information received from said one or more controllers.

11. The method of claim 1 wherein the security policy specifies that applications associated with the given tenant are restricted from reading files associated with other tenants.

12. The method of claim 1 wherein the security policy specifies that applications associated with the given tenant only communicate with applications that belong to the given tenant.

13. The method of claim 1 wherein the security policy specifies that an application associated with the given tenant only be scheduled on a physical machine on which no other instances of the same application are running.

14. A computer program product comprising a non-transitory processor-readable storage medium having encoded therein executable code of one or more software programs, wherein the one or more software programs when executed by the processing platform cause the processing platform to perform the steps of the method of claim 1.

15. An apparatus comprising:
   a processing platform comprising at least one processing device having a processor coupled to a memory, said processing platform implementing a security policy enforcement framework for cloud infrastructure of a cloud service provider;
   wherein the security policy enforcement framework comprises a policy analyzer configured to identify at least one security policy associated with a given tenant of the cloud service provider, to analyze the security policy against configuration information characterizing cloud infrastructure of the cloud service provider, and to control execution of one or more applications of the given tenant within the cloud infrastructure of the cloud service provider in accordance with the security policy based at least in part on one or more results of the analysis of the security policy;
   wherein the cloud infrastructure comprises physical infrastructure and associated virtualization infrastructure running on the physical infrastructure; and
   wherein the security policy associated with the given tenant comprises one or more tenant-specified rules related to isolation of the given tenant with respect to one or more other tenants of the cloud service provider.

16. The apparatus of claim 15 wherein the policy analyzer is configured to determine if the security policy is enforceable based on the configuration information characterizing the cloud infrastructure, and if the security policy is enforceable, to determine control information to be provided by the policy analyzer to one or more controllers of the security policy enforcement framework to carry out the security policy.

17. The apparatus of claim 16 wherein said one or more controllers comprise one or more of:
   a runtime controller configured to interface with runtime environments of said one or more applications;
   an operating system controller associated with an operating system utilized by the runtime environments of said one or more applications; and
   a hypervisor controller configured to interface with a hypervisor that implements a virtual machine utilized by said one or more applications.

18. The apparatus of claim 16 wherein said security policy enforcement framework is implemented in a platform-as-a-service (PaaS) layer of the cloud infrastructure and said one or more controllers comprise at least a PaaS controller configured to interface with a PaaS fabric of the PaaS layer.

19. The apparatus of claim 16 wherein the policy analyzer is configured to determine the configuration information based on information received from said one or more controllers.

20. A cloud-based information processing system comprising the apparatus of claim 15.

21. The method of claim 1 wherein the configuration information comprises information characterizing at least one of an application layer, a platform-as-a-service (PaaS) layer and an infrastructure-as-a-service (IaaS) layer of the virtualization infrastructure.

22. The method of claim 4 wherein the runtime environments comprise a first runtime environment utilizing a first programming language and at least a second runtime environment utilizing a second programming language different than the first programming language.

* * * * *